UNITED STATES PATENT OFFICE.

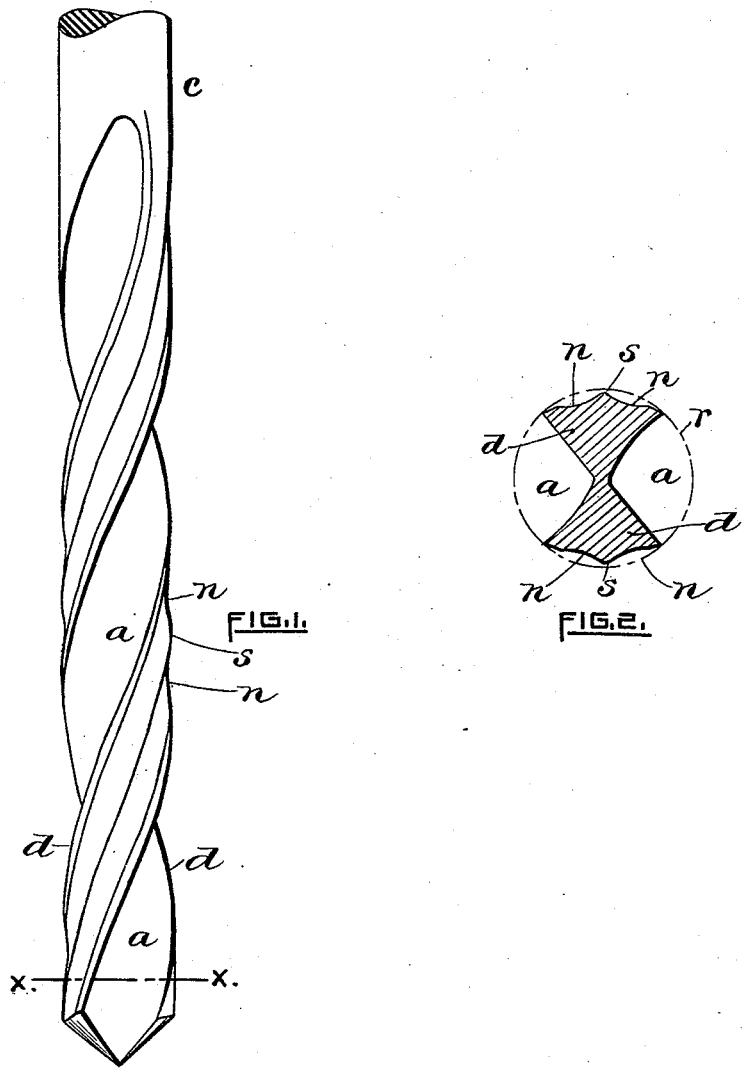

AARON B. SHIPPEE, OF PROVIDENCE, RHODE ISLAND, ASSIGNOR TO ALBERT W. CHAPMAN, OF SAME PLACE.

TWIST-DRILL.

SPECIFICATION forming part of Letters Patent No. 465,392, dated December 15, 1891.

Application filed September 21, 1891. Serial No. 406,314. (No model.)

*To all whom it may concern:*

Be it known that I, AARON B. SHIPPEE, of Providence, in the county of Providence and State of Rhode Island, have invented certain new and useful Improvements in Twist-Drills; and I do hereby declare that the following is a full, clear, and exact description thereof, reference being had to the accompanying drawings, and to the letters of reference marked thereon, which form a part of this specification.

This improvement in twist-drills consists in an important variation in the form of the spiral grooves whereby the wings or parts between those grooves are made stronger and of a shape suitable to form cutting-lips more advantageous for use. The back of the wings or outer bearing-surface of the drill is lightly grooved to improve the clearance and delivery of the chips made in drilling.

Figure 1 is an elevation of the grooved portion of a drill. Fig. 2 is a cross-section taken on line $x$ $x$, showing the shape of the main grooves in section and the shallow grooves on the outer surface.

The general form of the drill is the same as most of that class of drills—that is, a cylindrical bar of steel $c$, having for about two-thirds of its length two deep spiral grooves or flutes $a$ $a$ made in opposite sides of it, forming between them two wings $d$ $d$, connected together at the middle by a web, these wings constituting the working part of the drill. The shank by which the drill is held in a chuck or arbor may be either straight with parallel sides or tapering, as may be preferred. The form of the grooves $a$ $a$ is made angular or V-shaped in cross-section, forming nearly straight radial sides from near the center of the drill to the outside. The advantages of this shape are that it gives straight cutting-lips $e$ $e$, which can easily be ground sharp, and an increase of substance and strength to the wings or working part of the drill in cross-section, which of course makes the tool more durable.

Another improvement consists in making two shallow concave grooves $n$ $n$ lengthwise on the outside of the wings $d$ $d$ or outside of the drill, which grooves have slight ridges $s$ $s$ between them, running in the same direction. The drill is a little smaller in diameter from the top of one ridge to the top of the opposite ridge than the diameter of the outer cutting-edges of the wings, so that the top of the ridges will clear the inner surface of the metal in boring a hole, as seen in Fig. 2, in which the broken circle $r$ represents the hole being bored.

One advantage of the grooves $n$ $n$ is that, being too shallow to carry the chips made by the drill, they will form clear passages for the oil to reach the extreme inner end of the drill when the rush of chips back in the main grooves would prevent the oil from going in that way, especially in drilling deep holes, for in the usual form where the back of the wing is sloped away from the cutting-edge to the other edge of the wing the oil put on the wing is carried off into the main groove to be carried back by the chips. In very large drills the number of grooves and ridges may be increased to avoid making them so large as to weaken the drill or allow chips to enter.

Having thus described my improvements, I claim as my invention—

A twist-drill having shallow grooves with ridges intervening between them, made lengthwise of the wings or parts of the drill between the delivery-grooves, the tops of said ribs being a little below or inside of the circle of the hole the drill will make in use, substantially as set forth.

A. B. SHIPPEE.

Witnesses:
BENJ. ARNOLD,
CHARLES HANNIGAN.